(12) United States Patent
Frlan et al.

(10) Patent No.: US 7,873,073 B2
(45) Date of Patent: Jan. 18, 2011

(54) METHOD AND SYSTEM FOR SYNCHRONOUS HIGH SPEED ETHERNET GFP MAPPING OVER AN OPTICAL TRANSPORT NETWORK

(75) Inventors: Edward Frlan, Kanata (CA); Michael Watford, Kanata (CA)

(73) Assignee: Ciena Corporation, Linthicum, MD (US)

( * ) Notice: Subject to any disclaimer, the term of this patent is extended or adjusted under 35 U.S.C. 154(b) by 345 days.

(21) Appl. No.: 12/037,514

(22) Filed: Feb. 26, 2008

(65) Prior Publication Data

US 2009/0213873 A1    Aug. 27, 2009

(51) Int. Cl.
*H04J 3/06* (2006.01)
(52) U.S. Cl. ................. 370/466; 370/503
(58) Field of Classification Search ........... 370/503, 370/509, 516, 465, 466, 467, 907, 910, 401, 370/395.5
See application file for complete search history.

(56) References Cited

U.S. PATENT DOCUMENTS

| | | | |
|---|---|---|---|
| 7,035,253 B2 * | 4/2006 | Kuhlmann et al. | 370/356 |
| 7,102,446 B1 * | 9/2006 | Lee et al. | 331/11 |
| 7,158,596 B2 * | 1/2007 | Knapp et al. | 375/356 |
| 7,376,199 B1 * | 5/2008 | Nix | 375/295 |
| 7,660,330 B1 * | 2/2010 | Shmilovici | 370/503 |
| 2006/0133809 A1 * | 6/2006 | Chow et al. | 398/66 |
| 2007/0071443 A1 * | 3/2007 | Fukumitsu et al. | 398/79 |
| 2007/0116061 A1 * | 5/2007 | Meagher et al. | 370/503 |
| 2008/0080860 A1 * | 4/2008 | Katagiri | 398/43 |
| 2008/0267223 A1 * | 10/2008 | Meagher et al. | 370/505 |

* cited by examiner

*Primary Examiner*—Brian D Nguyen
(74) *Attorney, Agent, or Firm*—Christopher & Weisberg, P.A.

(57) ABSTRACT

An interworking device, method and system distribute reference timing between at least two communication networks. The interworking device includes a first communication interface operable to communicate with a first communication network operating using a first communication protocol and a second communication interface operable to communicate with a second communication network operating using a second communication protocol. The interworking device also includes a client generic framing procedure/optical transport network ("GFP/OTN") mapping block in communication with the first communication interface and the second communication interface. The client GFP/OTN mapping block recovers a first reference timing signal from data received from the first communication network. At least one hybrid synchronous equipment timing source transforms the first reference timing signal into a second reference timing signal that is phase and frequency locked to the first reference timing signal, and supplies the second reference timing signal to the client GFP/OTN mapping block to clock the second communication network.

18 Claims, 8 Drawing Sheets

METHOD AND SYSTEM FOR SYNCHRONOUS HIGH SPEED ETHERNET GFP MAPPING OVER AN OPTICAL TRANSPORT NETWORK

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for distributing timing within packet based networks and more specifically to a method and system for distributing reference timing between an Ethernet switched network and an optical transport network while maintaining phase stability and frequency accuracy.

BACKGROUND OF THE INVENTION

Until recently, packet networks, such as Ethernet, have been inherently asynchronous. However, as the data communication world moves toward an all Internet Protocol ("IP") core and Ethernet based edge network, there is a need to provide synchronization to transform information carried on packet based networks for transport on long distance data communication networks. In other words, mapping of Ethernet into a Time-Division-Multiplexed-based ("TDM") network such as Synchronous Optical Network ("SONET") or Optical Transport Network ("OTN") enables transport over very large distances, e.g., cross-continent, but also requires the Ethernet physical layer clock to be transported through the network for use as a TDM or Ethernet reference clock to time a SONET or SDH timing island if required.

Synchronous Ethernet network synchronization is a recently developed technology used to extend the well-known concepts of TDM network synchronization into the domain of packet-based networks, which until now have been specified as asynchronous in nature. The timing standard for synchronous Ethernet implementations has been defined by the Telecommunication Standardization Sector of the International Telecommunication Union ("ITU-T"), in recommendation G.8261, entitled "Timing and Synchronization Aspects in Packet Networks." ITU-T G.8261 specifies the maximum limits of allowable network jitter and wander through a packet network. Furthermore, G.8262 provides the minimum requirements for an Ethernet slave clock in terms of its wander generation, tolerance and transfer for network equipment at the TDM interfaces at the boundary of these packet networks, and the minimum requirements for the synchronization function of network elements. The goal is enable a Primary Reference Clock ("PRC") traceable clock for TDM applications to be maintained across an Ethernet switched network.

Timing distribution implies that the required phase stability and frequency accuracy of the reference timing signal is maintained as the data traverses across the Ethernet switched network. Several approaches have been used to transport native Ethernet traffic over a TDM network, including Ethernet over a fiber optic transport signal, e.g., synchronous transport module ("STM-n") or optical carrier ("OC-n") using contiguous concatenation ("CCAT"), and virtual concatenation ("VCAT") approaches.

Ten Gigabit Ethernet (whose physical layer is also referred to as "10GBASE-R") is the most recent and currently the fastest of the Ethernet standards. It defines a version of Ethernet with a nominal data rate of 10.3125 Gbits/s, i.e., MAC rate is ten times as fast as Gigabit Ethernet (whose physical layer is referred to as "1000BASE-X"). One approach for transporting 10GBASE-R packets over an optical TDM network is simply to over-clock the 10GBASE-R signal, which normally runs at 10.3125 Gb/s, to produce a "pseudo-OTU2" signal, or OTU2e (see ITU G.Sup43 Clause 7.1) running at approximately 11.09557 Gb/s. Since the standard Optical Channel Transport Unit-2 ("OTU2") signal normally runs at 10.709225 Gb/s, the over-clocked signal results in a further protocol on the OTN side to the standard one, requiring additional circuitry to implement and further complicating network management by creating potential traffic issues at OTU2 network interfaces between equipment providers. As such, the over-clocked OTU2e approach can work in Synchronous Ethernet but has its limitations.

Another common approach for 10GBASE-R clients is Generic Framing Procedure ("GFP") mapping of the 10GBASE-R client traffic into an OTU2 signal for transport over an OTN network, as outlined in ITU Recommendation G.7041, entitled "Generic Framing Procedure." Framed GFP mapping is typically preferred over over-clocking because the resulting OTU2 signal then runs at the standard 10.709225 Gb/s line rate. However, stability requirements of the OTN networks require a clock accuracy of at least ±20 ppm, while the 10GBASE-R clients nominally run at ±100 ppm. While G.8261 provides specifications for the timing requirements, it does not address how to actually implement these requirements.

Figure 1:
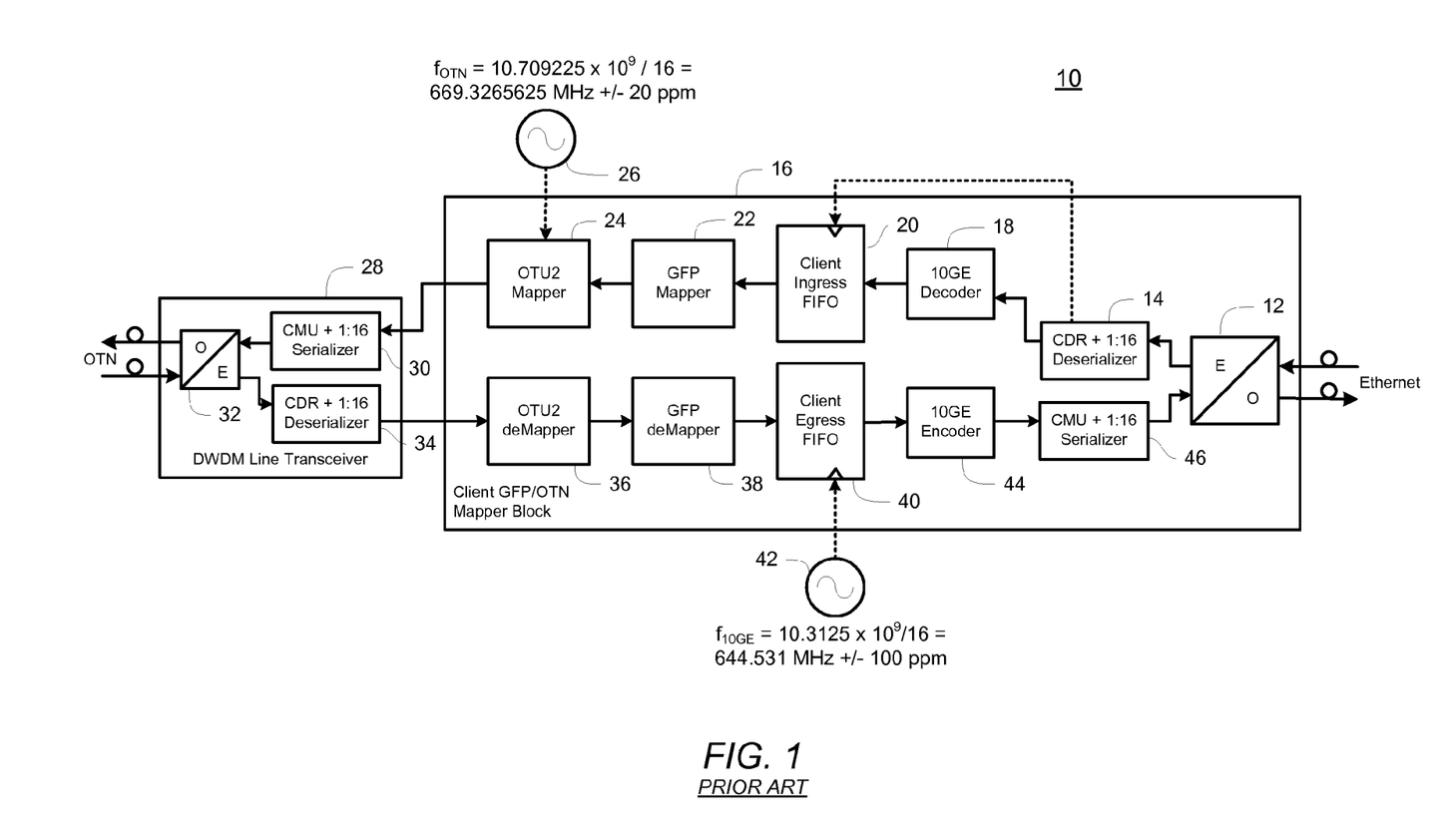
FIG. 1 is a block diagram of a prior art 10GBASE-R client/OTN transponder using asynchronous generic frame mapping.

Referring now to FIG. 1, details of a prior art method and 10GBASE-R client/OTN transponder, designated generally as 10, for transforming Ethernet packets into TDM, and vice versa, is displayed. FIG. 1 displays a first data path flowing from an Ethernet network to an optical transport network (right to left). Similarly, a second data path flowing from the optical transport network to the Ethernet network (left to right) is also displayed. To convert from Ethernet to OTN, data enters the 10GBASE-R client/OTN transponder 10 from a 10GBASE-R, or similar, client interface. The data packets, encoded using the 10 Gigabit Ethernet protocol, are first transformed from an optical form to an electrical form by an optical/electrical ("O/E") converter 12 to produce an electronic data stream having a data rate of 10.3125 Gb/s with an accuracy of ±100 ppm. This data stream then passes through a clocked data recovery ("CDR") plus 1:16 deserializer 14 to produce sixteen independent data streams running in parallel at a nominal rate of 10.3125/16 GHz (f=644.53125 MHz). This deserialization is necessary because the GFP mapping functions of the client GFP/OTN mapper block 16 are not presently capable of running at the full data rate, thus the framed-GFP mapping functions are performed simultaneously on all sixteen streams at a rate equal to 1/16 of the data rate. Each data stream is then decoded by a 10GE decoder 18 and temporarily stored in a client ingress FIFO 20. The client ingress FIFO 20 is timed by a clock signal recovered by the CDR plus 1:16 deserializer 14 from the incoming data stream. Next, a GFP mapper 22 converts each media access control ("MAC") frame in the incoming Ethernet packets to a GFP frame. An OTU2 mapper 24 converts the GFP frames to OTU2 frames using a free-running local clock 26 as the timing source. The local clock operates at a frequency of 10.709225×10⁹/16=669.3265625 MHz, with an accuracy of ±20 ppm. The resulting sixteen streams of OTU2 frames are then passed through a dense wave division multiplex ("DWDM") line transceiver 28, which converts the sixteen parallel data streams back into a single data stream using a Clock Multiply Unit ("CMU") plus 1:16 serializer 30, which is a PLL that generates a line clock from the incoming 16-bit data clock, e.g., in this case a ×16 multiply function, and transforms the single electrical data signal to an optical signal through a second O/E converter 32. The output data stream is an OTU2 signal with a frequency of 10.709225 Gb/s ±20 ppm for delivery to the OTN network. However, because the timing of the input signal and the output signal are not tied together, the phase and frequency of the reference clocks for the two networks are completely asynchronous. Thus, this approach will not work for synchronous Ethernet.

In the reverse direction, i.e. OTN to Ethernet, OTU2 data frames from the OTN network enter the DWDM line transceiver 28, are converted from optical to electrical signals by the O/E converter 32, and then deserialized to sixteen parallel OTU2 streams by a second CDR plus 1:16 deserializer 34. The OTU2 frames are converted to GFP frames by an OTU2 deMapper 36, and then the GFP frames are converted to MAC frames by a GFP deMapper 38. The GFP deMapper 38 inserts or deletes "idle" frames into the MAC frames in order to maintain the proper timing. The resulting MAC frames are then queued in a client egress FIFO 40 which is timed by a second local free-running clock 42 operating at a frequency of $f_{10GE}$=10.3125×10⁹/16=644.531 MHz ±100 ppm. The MAC frames are then placed in Ethernet packets by a 10GE encoder 44 which inserts the proper headers and packs the frames as needed for delivery. A second CMU plus 1:16 serializer 46 then serializes the sixteen parallel Ethernet data streams into a single 10GBASE-R data stream operating at a frequency of 10.3125 MHz ±100 ppm. This single data stream is converted from an electrical signal to an optical signal (if necessary) for delivery in the 10GBASE-R packet network by the O/E converter 12.

Because the timing sources in the above prior art method are not synchronized, this method is unsuitable for use with Synchronous Ethernet networks. Therefore, what is needed is a system and method for distributing reference timing between an Ethernet switched network and an optical transport network while maintaining phase stability and frequency accuracy.

SUMMARY OF THE INVENTION

The present invention advantageously provides a method, system and interworking device for distributing reference timing between at least two communication networks. Generally, the present invention advantageously provides a timing signal to one network that is phase and frequency locked to a timing source for the other network, thereby synchronously maintaining timing across both networks.

One aspect of the present invention includes an interworking device having at least one first communication interface operable to communicate with a first communication network operating using a first communication protocol, and at least one second communication interface operable to communicate with a second communication network that operates using a second communication protocol. The interworking device also includes a client GFP/OTN mapping block which communicates with both communication interfaces. The client GFP/OTN mapping block recovers a first reference timing signal from data received from the first communication network. The interworking device further includes at least one hybrid synchronous equipment timing source which transforms the first reference timing signal to a second reference timing signal that is phase and frequency locked to the first reference timing signal and supplies the second reference timing signal to the client GFP/OTN mapping block to clock the second communication network.

In accordance with another aspect, the present invention provides a system for distributing reference timing between at least two different communication networks. The system includes at least one first communication network operating according to a first communication protocol, and at least one second communication network operating according to a second communication protocol. An interworking device communicatively coupled between the first communication network and the second communication network recovers a first reference timing signal from data received from the first communication network and transforms the first reference timing signal to a second reference timing signal. The second reference timing signal is phase and frequency locked to the first reference timing signal. The second reference timing signal is used to clock the second communication network.

In accordance with still another aspect, the present invention provides a method for distributing timing between at least two different communication networks. The method includes recovering a first reference timing signal from data received from the first communication network. The first reference timing signal is transformed to a second reference timing signal that is phase and frequency locked to the first reference timing signal. The second reference timing signal is supplied to clock the second communication network.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it should be observed that the embodiments reside primarily in combinations of apparatus components and processing steps related to implementing a system and method for distributing reference timing between an Ethernet switched network and an optical transport network while maintaining phase stability and frequency accuracy. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements.

Generally, one embodiment of the present invention recovers a timing signal from data received from a first network operating according to a 10GBASE-R or an OTN protocol, and uses the timing signal as a reference input to a synchronous equipment timing source to create a second timing signal used to provide timing to the other network. The second timing signal is phase locked and frequency locked to the first timing signal and meets the requirements of ITU G.8261. Additionally, four parallel 10GBASE-R signals may be mapped to the OTU3 protocol, and the timing signal recovered from one of the 10GBASE-R signals is used as a reference to time Optical Channel Data Unit-2 ("ODU2") frames within the OTU3 signal, and optionally, the actual OTU3 signal. Alternatively, timing from the OTU3 line may be recovered and used to clock the four parallel 10GBASE-R signals.

Figure 2:
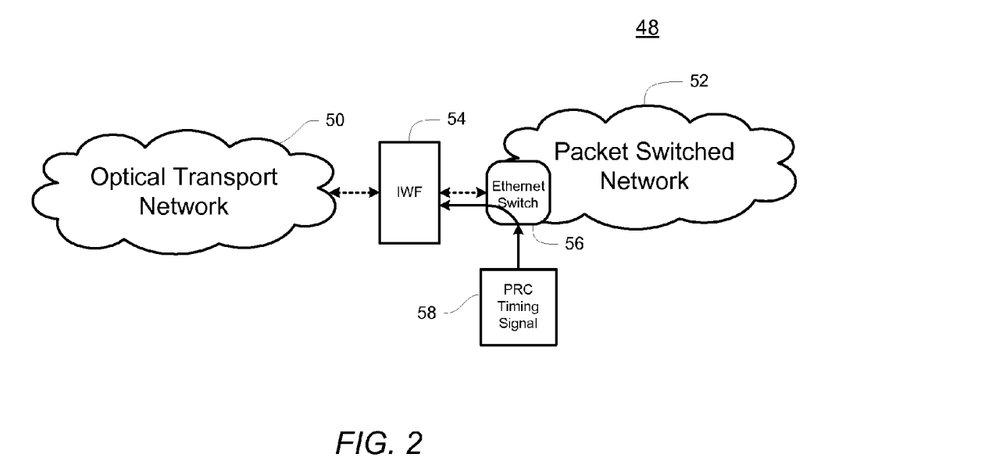
FIG. 2 is a block diagram of an exemplary system constructed in accordance with the principles of the present invention.

Referring now to the drawing figures in which like reference designators refer to like elements, there is shown in FIG. 2, a data communication system constructed in accordance with the principles of the present invention and designated generally as "48." System 48 includes an optical transport network 50 and a packet switched network 52. The optical transport network 50 may use Synchronous Optical Networking ("SONET"), Synchronous Digital Hierarchy ("SDH") or Optical Transport Network ("OTN") standards or any other networking arrangement that provides TDM isochronous bit streams. Data from the optical network 48 is passed to an interworking function ("IWF") block 54 which provides clocking adaptation and mapping between TDM and packet domains. The transformed data then passes through an Ethernet switch 56 for distribution within the packet switching network 52. The Ethernet switch 56 supports synchronous Ethernet physical layer ("PHY").

Timing to the IWF 48 is provided over the Ethernet PHY through a primary reference clock ("PRC") 58 and is discussed in greater detail below. The phase stability and frequency accuracy of the PRC 58 is maintained throughout the OTN 50 as well as the packet switched network 52. Likewise, data may flow in the reverse direction from the packet switched network 52, through the IWF 48 and to the optical transport network 50. Although only one optical network 50 and one packet switched network 52 are illustrated, it is understood that the principles of the present invention may be expanded to include multiple OTNs and/or packet switched networks, in which case, timing for each network may be provided by a single PRC 58.

Figure 3:
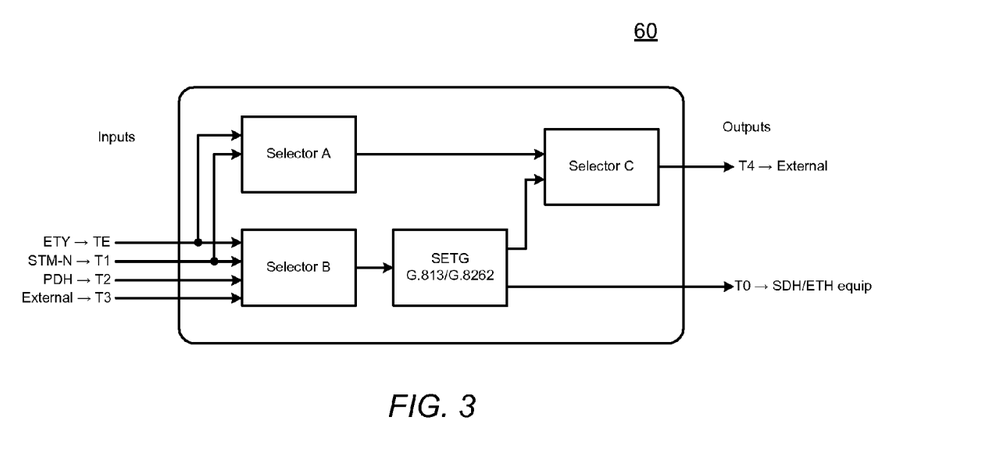
FIG. 3 is a block diagram of a synchronous equipment timing source constructed in accordance with the principles of the present invention.

One embodiment of the present invention provides a method for distributing timing from one network, e.g. OTN network or Ethernet network, to a second network using a different protocol, e.g., Ethernet network or OTN network, while maintaining all the characteristics of the original clock. In order to transfer these characteristics across the networks, a stable timing source having a phase-locked loop ("PLL") adhering to strict filtering requirements is needed. One such timing source is a synchronous equipment timing source ("SETS"). SETS modules are generally known in the industry and commonly used in SONET/SDH networks to generate frame synchronization pulses. A modified, hybrid SETS module 60, constructed in accordance with the principles of the present invention, is illustrated in FIG. 3. The hybrid SETS module 60 uses a reference clock signal to provide the SONET or Ethernet clock. For example, in the Ethernet to OTU2 direction the hybrid SETS module 60 sources the recovered 10GBASE-R clock at 644.53125 MHz and generates an OTU2 clock at 669.32658 MHz using the multiplication factor of 64/66*77760/78125*255/237. The phase and frequency lock actually occurs at the PLL reference frequency of 2 kHz internally. In other words, the input clock is multiplied by 64/66*1/64*1/78125=2 kHz, and then the PLL in the hybrid SETS 60 generates the output 669.3266 MHz clock by multiplying the reference 2 kHz frequency by 77,760*64*255/237. The resulting output clock T0, which is used to time the Ethernet network or the OTN (SONET/SDH) network, is phase and frequency locked to the input clock.

The SETS module 60 differs from traditional SETS modules in that an additional input source, TE, is provided to transfer the Ethernet physical layer timing from the Ethernet network. Also, previously available hybrid SETS chips carry out the 77,760/78125 or 78125/77,760 multiply factors but external PLLs are required for the 64/66 (or 66/64) and 255/237 or (237/255) multiply factors. The hybrid SETS block 60 constructed in accordance with the principles of the present invention may include the entire required multiply function within the SETS module. Additionally, the TE input receives an Ethernet PHY Layer ("ETY") clock, for example, as defined by ITU G.8262. For example, the TE clock can run at approximately 156.25 MHz, i.e., 10312.5 MHz×64/66×1/64, whereas a practical SONET reference clock would run at 155.52 MHz.

Figure 4:
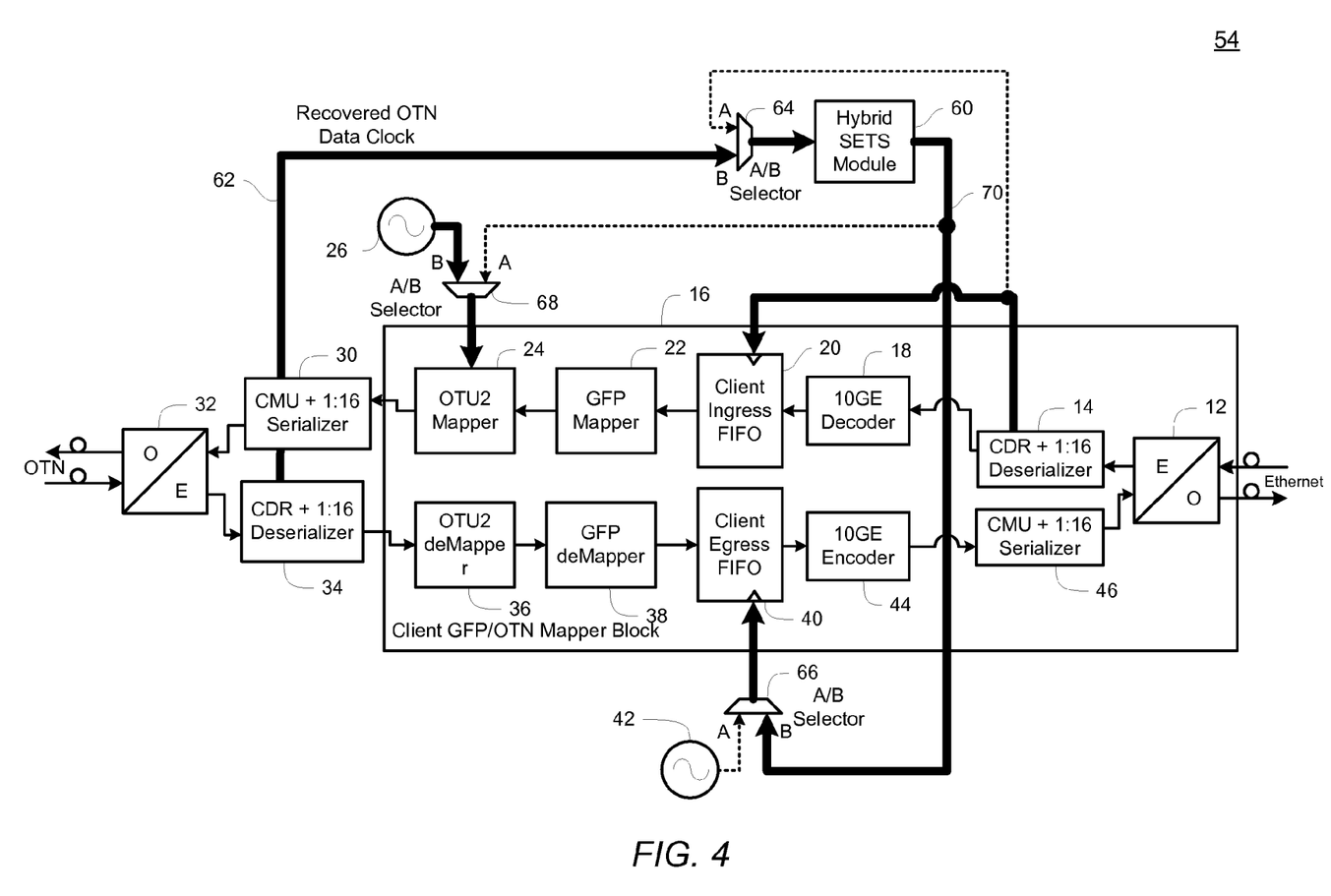
FIG. 4 is a block diagram of an exemplary 10GBASE-R client/OTN transponder using synchronous generic frame mapping constructed in accordance with the principles of the present invention.

Referring now to FIG. 4, a block diagram illustrating one embodiment of the present invention is shown. In FIG. 4, a client GFP/OTN mapper block 16 as described above in relation to FIG. 1, is used to convert OTN frames to Ethernet frames, and vice versa; however, the timing scheme has been altered to advantageously provide synchronous clocking across both networks. Timing from the OTN network is transferred to the Ethernet network through the CDR plus 1:16 deserializer 34, which recovers a clock 62 from the incoming OTU2 data. The timing path for the IWF 54 shown in FIG. 4 may be altered by selecting a timing source through the use of three A/B selectors 64, 66, 68. The selected path in this exemplary embodiment is shown as a heavy solid line, while the non-selected path is shown as a dashed line. The recovered data clock signal 62 is selected at A/B selector 64 as the reference source for the hybrid SETS block 60 by setting the selected path to input B. Thus, the output signal 70 is phase and frequency locked to the incoming recovered data clock signal 62 from the OTU2 input stream. When data is transferred in the OTN to Ethernet direction (in FIG. 4, the left to right direction), the output clock signal 70 is selected at A/B selector 66 by setting the selected path to input B to clock the client egress FIFO 40, thereby transferring the timing from the OTN network to the data exiting to the Ethernet network. When data is transferred in the Ethernet to OTN direction (in FIG. 4, the right to left direction), a local, free-running clock 26 is selected at A/B selector 68 to time the OTU2 mapper 24 by setting the selected path to input B. Thus, timing is maintained only in the OTN to Ethernet direction. In the Ethernet to OTN direction, if selector 68 selected the A path instead of the B path, the Ethernet to OTN mapping would work equally as well but, in effect, would also be providing loop timing back to the OTN network, i.e., the recovered OTN timing from deserializer 34 would be sent back into the OTN network; however, the Ethernet to OTN timing would still be asynchronous.

Alternatively, the timing source for the OTU2 mapper 24 could be derived from the recovered data clock 62 using a second SETS module (not shown), making the overall architecture slightly more complex, but ensuring that outgoing OTU2 frames have the same time reference as the incoming OTU2 frames. However, in a real network, the timing would likely never need to be transferred in both directions simultaneously.

Figure 5:
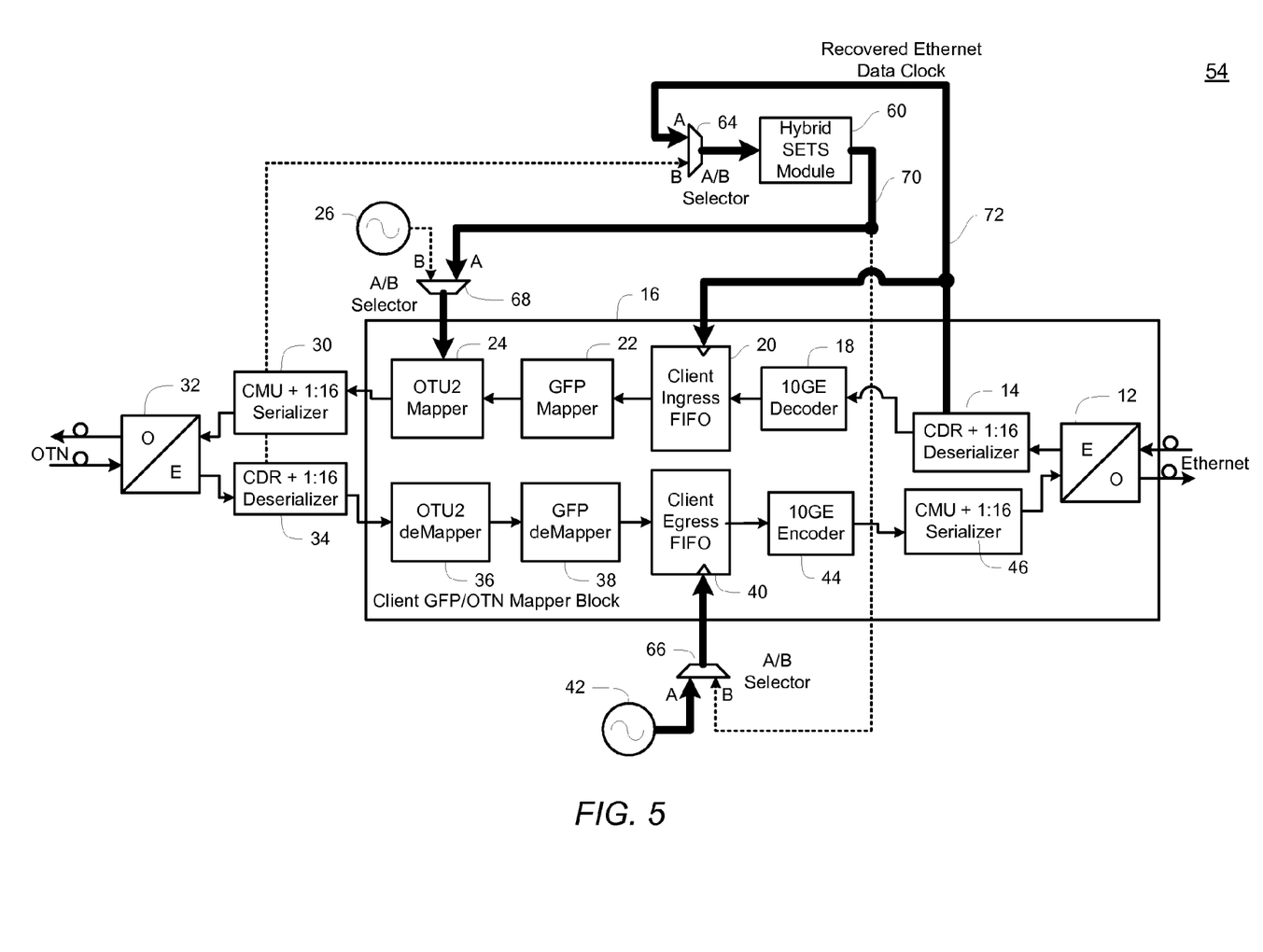
FIG. 5 is a block diagram of an alternative exemplary 10GBASE-R client/OTN transponder using synchronous generic frame mapping constructed in accordance with the principles of the present invention.

Referring now to FIG. 5, the opposite scenario of that depicted in FIG. 4 is shown. In FIG. 5, timing from the Ethernet network is transferred to the OTN network. As with FIG. 4, the selected timing path is indicated by a heavy, solid line and the non-selected path is shown as a dashed line. The elements in FIG. 5 are the same as shown in FIG. 4, only a different timing path has been selected. In FIG. 5, the reference timing signal 72 is recovered from the incoming Ethernet data at the CDR plus 1:16 deserializer 14 on the Ethernet side. The recovered data clock 72 is not only used to time the client ingress FIFO 20 in the Ethernet to OTN direction (right to left in FIG. 5), but also as the input reference source for the hybrid SETS module 60. The output signal 70 from the SETS module 60 is phase and frequency locked to the recovered Ethernet clock 72 and is selected at A/B selector 68 (input A) as the timing source for the OTU2 mapper 24. Thus, the outgoing OTU2 signals have the same phase and frequency accuracy as the incoming Ethernet data. When the data is transferred from OTN to Ethernet, the timing for the client egress FIFO 40 is provided by a local free-running clock 42, thus the timing is not maintained in this direction. As mentioned above, to maintain Ethernet to OTN and OTN to Ethernet timing transfer at the same time, an additional SETS module 60 can be used.

The methods described above in relation to synchronous Ethernet GFP mapping of a 10BASE-R signal into an OTU2 line may be extended to higher rate Ethernet signals, such as those at 100 Gb/s or 40 Gb/s rates. For example, timing for OTU3 signals, operating at a data rate of approximately 43 Gb/s, may be transferred to 40 Gb/s Ethernet networks. Additionally, the methods employed by the present invention may be used to multiple streams of 10GBASE-R data for distribution on higher rate OTN networks, e.g., OTU3 networks.

Figure 6:
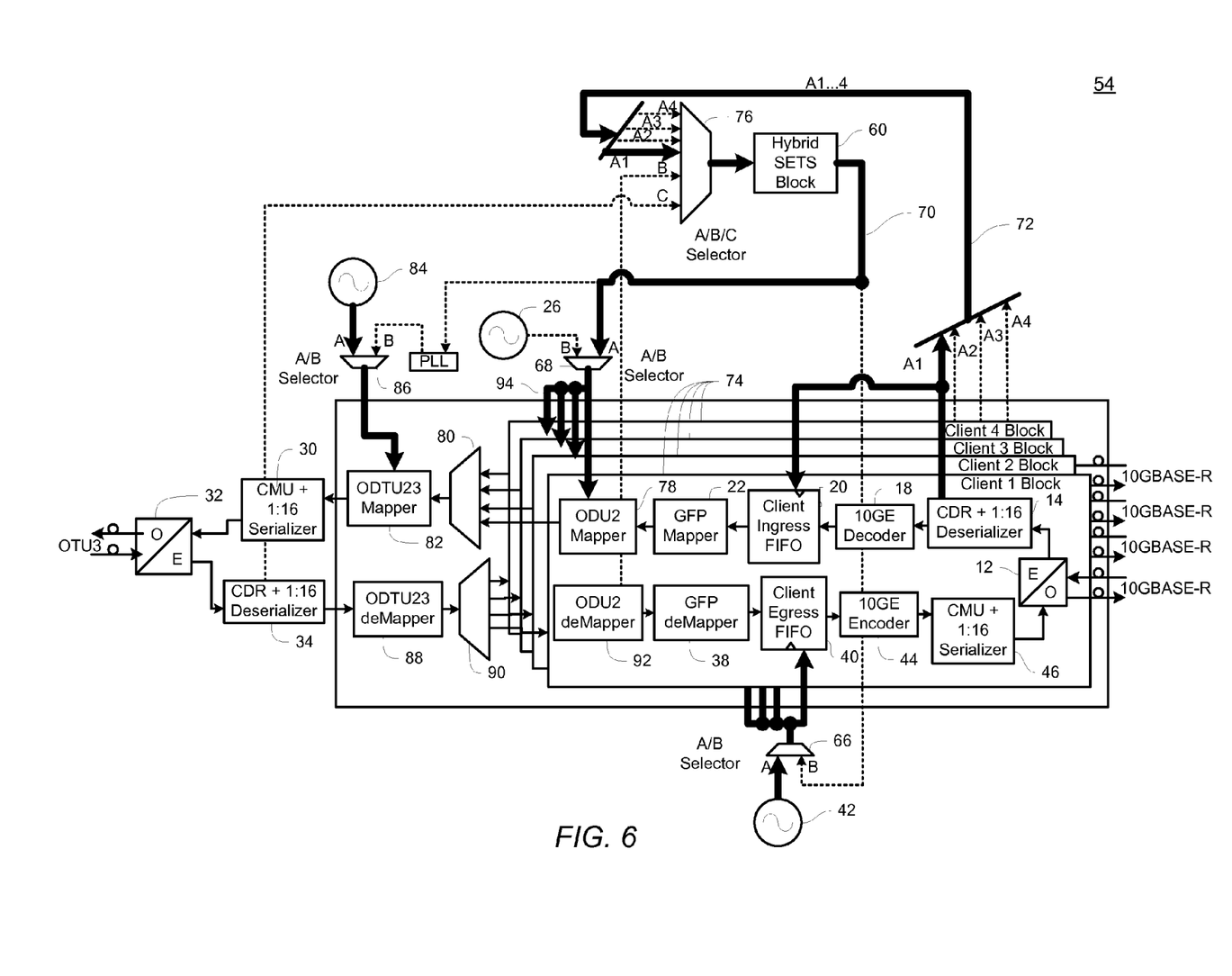
FIG. 6 is a block diagram of an exemplary 40G client/OTN transponder using synchronous generic frame mapping constructed in accordance with the principles of the present invention.

Referring now to FIG. 6, an exemplary IWF 54 is depicted which maps four streams of 10GBASE-R data into one OUT3 line and maintains the timing of one 10GBASE-R clients through to the OUT3 line. In FIG. 6, four client GFP/ODU2 mapper blocks 74 are run in parallel. However, instead of mapping to the OTU2 mapper 24 as before, the client data is GFP mapped to an ODU2 clock which is synchronous to the 10GBASE-R clock. In other words, when data traffic is transported from Ethernet to OTN, i.e. right to left, the recovered data clock 72 from the CDR plus 1:16 deserializer 14 of one of the four client mapper blocks 74 is used to supply the clock signal for the client ingress FIFO 20 as well as the reference timing source for the hybrid SETS module 60. A/B/C selector 76 is set to input A to select one of the recovered Ethernet data clocks 72. The output signal 70 of the hybrid SETS module 60 is used to drive an ODU2 mapper 78 by selecting input A on A/B selector 68. Then, the four output streams from each client GFP/ODU2 mapper 74 are asynchronously mapped to an OTU3 data stream via a G.709 4×ODU2 multiplexer 80 into an ODTU23 mapper 82. The ODTU23 mapper 82 runs asynchronously, using byte stuffing to accommodate the individual ODU2 data streams into a free-running OTU3 line clock 84 which is selected by setting A/B selector 86 to the A setting. The timing of one of the Ethernet clients has now been transferred onto the ODU2 mapping clock, which can be recovered at the network to create a far-end local Synchronous Ethernet clock. Similarly, for traffic flowing from West to East, an OTU3 signal is split into sixteen parallel streams by the CDR plus 1:16 deserializer 34, then demapped from an OTU3 signal into an ODU2 signal by the ODTU23 demapper 88 and demuxed by the G.709 4×ODU2 demultiplexer 90 into four separate sets of parallel ODU2 frames for input into each of the four client GFP/ODU2 mapper blocks 74. Each stream is then converted from an ODU2 frame to a GFP frame through an ODU2 demapper 92. As with the single client case, the clock for the client egress FIFO is an asynchronous, free-running local clock 42, so the output for data flowing from OTN to Ethernet is asynchronous. So, for the case illustrated in FIG. 6, the ODU2 clock 94 for all clients may be synchronous to the recovered data clock of one of the clients. With a more complex architecture, which may include up to four SETS blocks per direction, each client would have its dedicated SETS, so each client's specific ODU2 mapping clock 94 would be synchronous to its corresponding client reference clock 72.

This multiplexing architecture is similar to the original simple case of one client mapped to a 10.709 Gb/s OTU2 line, however, now the timing of the ODU2 is buried within the asynchronously timed OTU3 line. At the far end of a point-to-point link, the original ODU2 clock may be obtained using a PLL desynchronizer (not shown explicitly, but contained within the ODU2 demapper block). Basically, with the 4×10GBASE-R architecture outlined above, 10GBASE-R timing may be transferred across an OTU3 network for one client, or up to four clients, independently, based on the number of interconnected SETS blocks.

Figure 7:
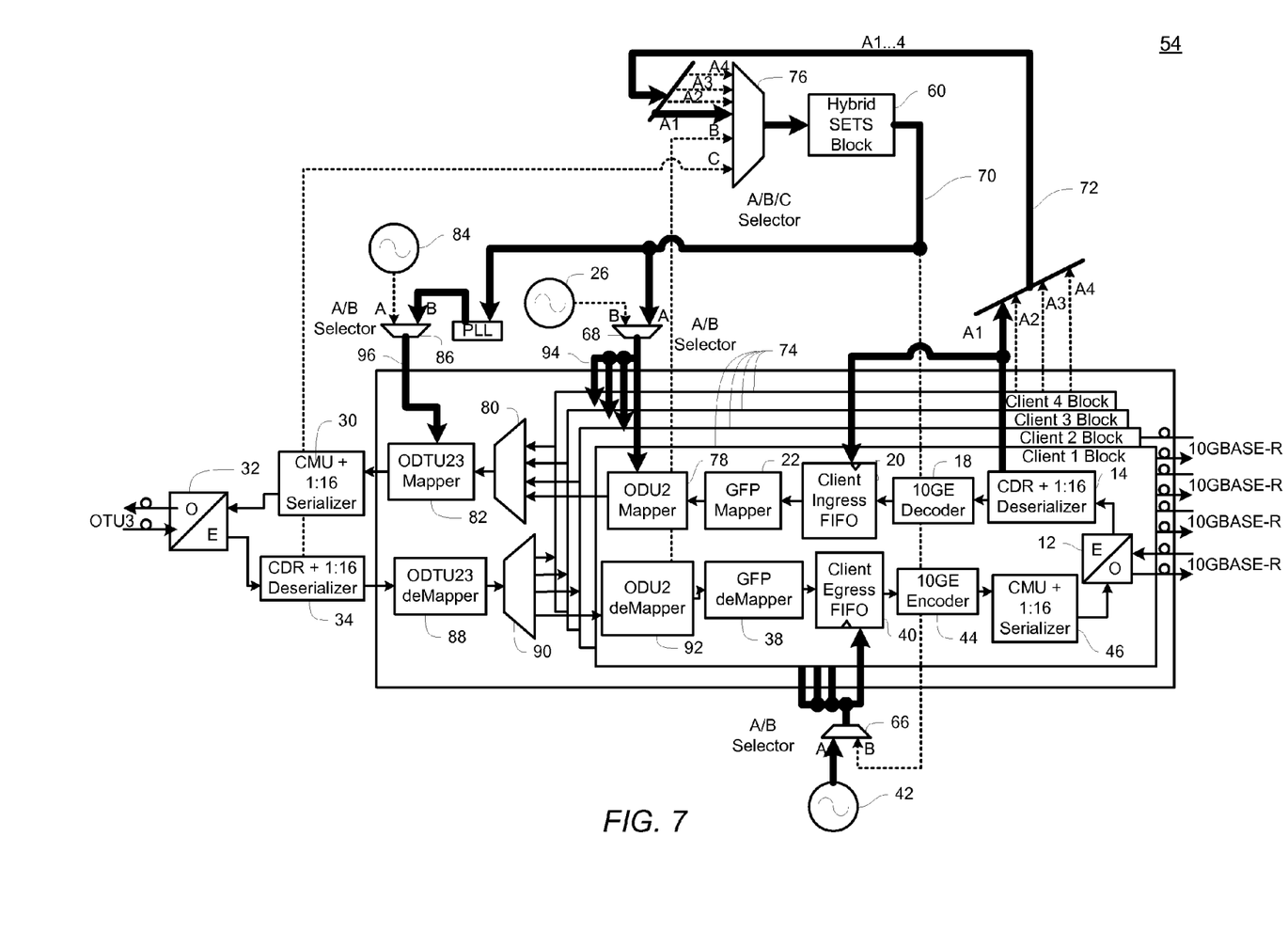
FIG. 7 is a block diagram of an alternative exemplary 40G client/OTN transponder using synchronous generic frame mapping constructed in accordance with the principles of the present invention.

FIG. 7 depicts an alternative method for distributing timing from one of four parallel 10GBASE-R channels to an OTU3 network. The elements are the same as those shown in FIG. 6. However, the actual timing for the OTU3 line is generated synchronously from one of the four 10GBASE-R clients. The line OTU3 clock 96 is no longer free-running, but is generated from the output 70 of the SETS block 60 via a PLL 98 which is set by selecting the B path from the A/B selector 86. The PLL 96 is shown in FIG. 7 as being separate from the SETS block 60, but this functionality may easily be integrated into the actual SETS block 60. The output clock 70 from the SETS block 60 is also used to supply the ODU2 mapping clock 94. The reference clock for the SETS block 60 is the recovered data clock 72 from one of the four 10GBASE-R clients.

Figure 8:
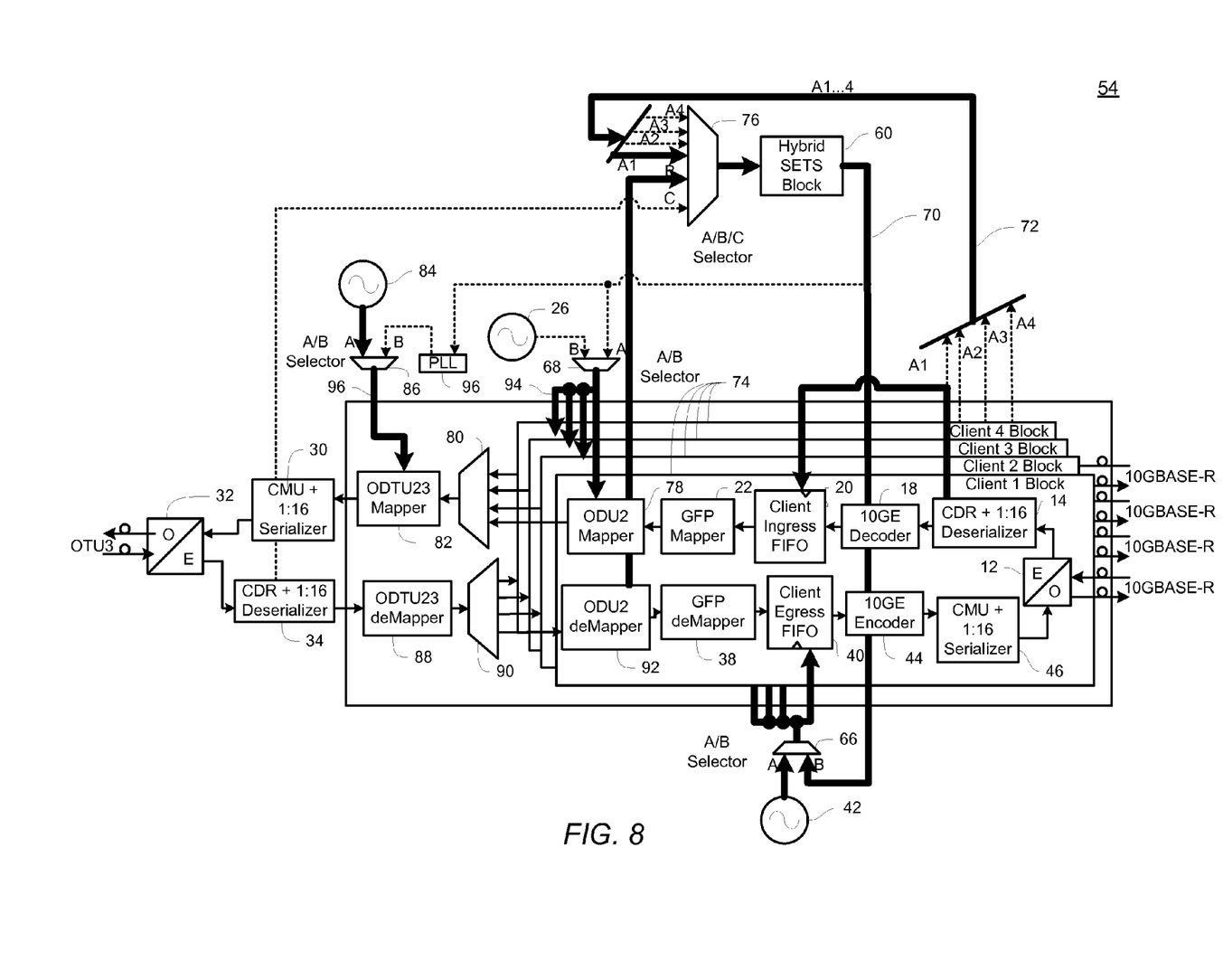
FIG. 8 is a block diagram of another alternative exemplary 40G client/OTN transponder using synchronous generic frame mapping constructed in accordance with the principles of the present invention.

FIG. 8 illustrates an exemplary method for distributing timing from an OTU3 network to four parallel 10GBASE-R channels. The elements are the same as shown in FIGS. 6 and 7, but the timing path has been altered. According to this embodiment, the recovered ODU2 clock 100 is used as the reference signal for the SETS module 60, which, in turn, times the client egress FIFO 40 similarly to the method shown in FIG. 4 for a single OTU2 case.

Figure 9:
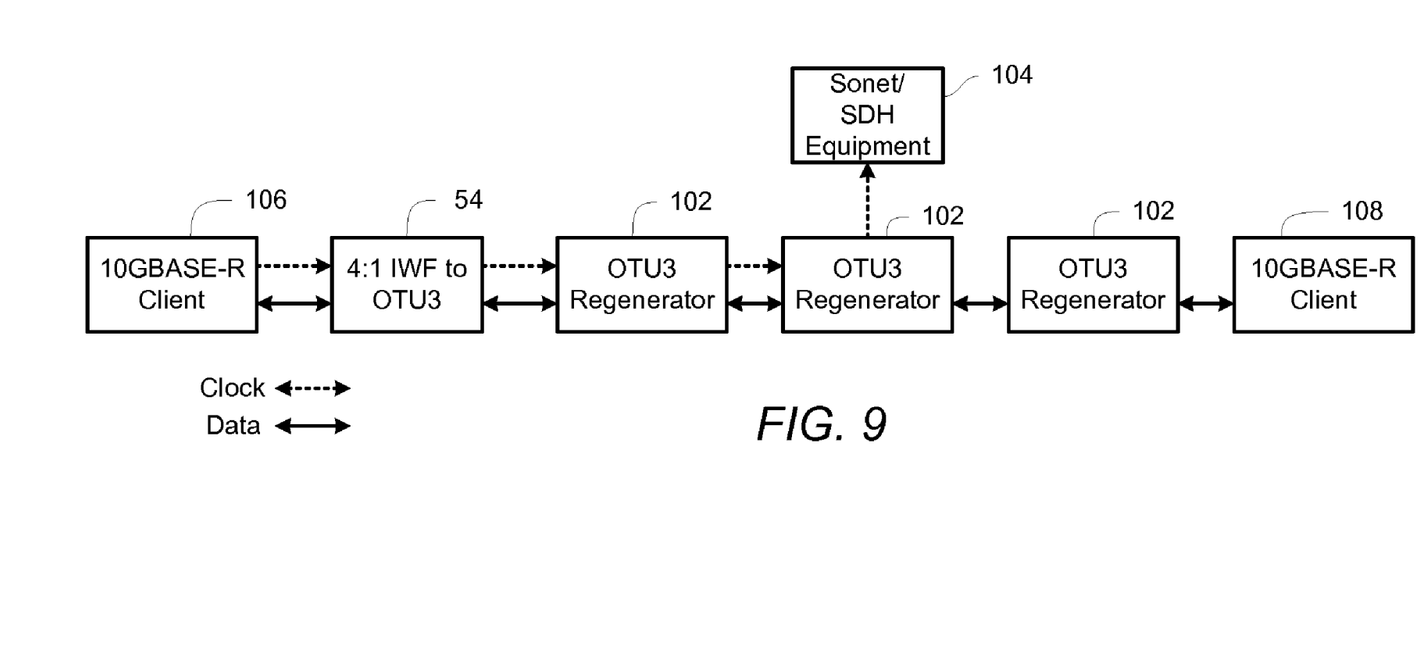
FIG. 9 is a block diagram of a exemplary implementation of the present invention to provide a reference timing source to intermediate SONET/SDH equipment.

Although standards like G.709 do not require that the OTU3 clock be synchronous to the ODU2 clock, or even to the 10GBASE-R client clock for GFP mapping of 10GBASE-R traffic, by implementing the method described in FIG. 7, 10GBASE-R timing may be distributed into an OTU3 network for use by other networks. For example, as shown in FIG. 9, it is feasible that in a network with multiple OTU3 regenerators 102, the embedded 10GBASE-R timing could be used to provide a reference timing source to other SONET or SDH equipment 104 at intermediate sites. The clock signal from a 10GBASE-R client 106 which is recovered by the 4:1 10GBASE-R to OTU3 interworking function 54 described above, may be passed through multiple OTU3 regenerators 102 and remain stable enough, i.e. meets jitter, wander, and frequency accuracy requirements, to drive the SONET/SDH equipment 106.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An interworking device for distributing reference timing between at least two different communication networks, the interworking device comprising:
   at least one first communication interface operable to communicate with a first communication network, the first communication network operating using a first communication protocol at a first clock frequency of a first clock signal;
   at least one second communication interface operable to communicate with a second communication network, the second communication network operating using a second communication protocol at a second clock frequency of a second clock signal;
   a client generic framing procedure/optical transport network ("GFP/OTN") mapping block in communication with the first communication interface and the second communication interface, the client GFP/OTN mapping block converting first data in the first communication protocol at the first clock frequency recovered from a signal from the first communication network to second data in the second communication protocol at the second clock frequency, and converting third data in the second communication protocol at the second clock frequency recovered from a signal from the second communication network to fourth data in the first communication protocol at the first clock frequency;
   at least one hybrid synchronous equipment timing source, the hybrid synchronous equipment timing source:
      deriving the first clock signal from the second clock signal when converting data from the second protocol to the first protocol and deriving the second clock signal from the first clock signal when converting data from the first protocol to the second protocol; and
   at least one switch communicatively coupled to the client GFP/OTN mapping block and communicatively coupled to the at least one hybrid synchronous equipment timing source, the switch selectively providing a reference timing signal to the client GFP/OTN mapping block.

2. The interworking device of claim 1, wherein the first communication protocol is one of 10GBASE-R and OTU2 and the second communication protocol is the other of 10GBASE-R and OTU2.

3. The interworking device of claim 2, wherein the client GFP/OTN mapping block includes a client egress FIFO, the client egress FIFO mapping generic framing procedure ("GFP") frames to media access control ("MAC") frames, the second clock signal providing timing for the client egress FIFO.

4. The interworking device of claim 2, wherein the client GFP/OTN mapping block further includes an OTU2 mapper, the OTU2 mapper maps generic framing procedure ("GFP") frames to OTU2 frames, the second clock signal providing timing for the OTU2 mapper.

5. The interworking device of claim 2, wherein the first communication network includes four 10GBASE-R channels and the second communication protocol is OTU3, the interworking device further including four parallel client generic framing procedure/optical data channel unit 2 ("GFP/ODU2") mappers, each client GFP/ODU2 mapper corresponding to one of the four 10GBASE-R channels.

6. The interworking device of claim 5, wherein each client GFP/ODU2 mapper includes an ODU2 mapper, and wherein the first clock signal is recovered from one of the 10GBASE-R channels, each ODU2 mapper:
   mapping generic framing procedure ("GFP") frames to ODU2 frames for each of the four 10GBASE-R channels, the second clock signal providing timing for each ODU2 mapper.

7. The interworking device of claim 6, wherein the interworking device further includes:
   a phase locked loop ("PLL") communicatively coupled to the hybrid synchronous equipment timing source, the PLL transforming the second clock signal to a third clock signal wherein the third clock signal is phase and frequency locked to the second clock signal;
   a multiplexer communicatively coupled to each ODU2 mapper, the multiplexer serializing the ODU2 frames from each ODU2 mapper; and
   an ODTU23 mapper, communicatively coupled to the multiplexer, the ODTU23 mapper mapping the serialized ODU2 frames into OTU3 frames, and wherein the third clock signal supplies a clock to the ODTU23 mapper.

8. The interworking device of claim 2, wherein the first communication protocol is OTU3 and the second communication network includes four 10GBASE-R channels, the interworking device further including four parallel client GFP/ODU2 mappers, each client GFP/ODU2 mapper corresponding to one of the four 10GBASE-R channels.

9. The interworking device of claim 8, wherein each GFP/ODU2 mapper includes:
   an ODU2 mapper, wherein the first clock signal is recovered from one of the ODU2 mappers;
   a client egress FIFO, the second clock signal providing timing for the client egress FIFO; and
   a GFP mapper communicatively coupled to the client egress FIFO, the GFP mapper mapping generic frame procedure ("GFP") frames to media access control ("MAC") frames via the client egress FIFO.

10. A system for distributing reference timing between at least two different communication networks, the system comprising:
   at least one first communication network, each first communication network operating according to a first communication protocol at a first clock frequency;

at least one second communication network, each second communication network operating according to a second communication protocol at a second clock frequency; and an interworking device communicatively coupled to the first communication network and the second communication network, the interworking device:
- recovering a first clock signal from data received from the first communication network;
- deriving a second clock signal from the first clock signal, the second clock signal being phase and frequency locked to the first clock signal, the first and second clock signals being based on a reference timing signal from a switch coupled to a hybrid synchronous equipment timing source;
- supplying the second clock signal to clock the second communication network at the second clock frequency;
- recovering a third clock signal from data received from the second communication network;
- deriving a fourth clock signal from the third clock signal, the fourth clock signal being phase and frequency locked to the third clock signal; and
- supplying the fourth clock signal to clock the first communication network at the first clock frequency.

11. The system of claim 10, wherein the first communication protocol is one of 10GBASE-R and OTU2 and the second communication protocol is the other of 10GBASE-R and OTU2.

12. The system of claim 11, wherein the interworking device includes a client egress FIFO, and wherein the interworking device further maps generic framing procedure ("GFP") frames to media access control ("MAC") frames via the client egress FIFO, the second clock signal providing timing for the client egress FIFO.

13. The system of claim 11, wherein the interworking device includes an OTU2 mapper, and wherein the interworking device further maps generic framing procedure ("GFP") frames to OTU2 frames via the OTU2 mapper, the second clock signal providing timing for the OTU2 mapper.

14. The system of claim 10, wherein the at least one first communication network includes four 10GBASE-R channels and the second communication protocol is OTU3.

15. The system of claim 14, wherein the interworking device further includes four parallel client GFP/ODU2 mappers, each client GFP/ODU2 mapper corresponding to one of the four 10GBASE-R channels.

16. The system of claim 15, wherein each client GFP/ODU2 mapper includes an ODU2 mapper, and wherein the first clock signal is recovered from one of the 10GBASE-R channels, the interworking device further:
- mapping generic framing procedure ("GFP") frames to ODU2 frames via the ODU2 mapper for each of the four 10GBASE-R channels, the second clock signal providing timing for each ODU2 mapper;
- serializing the ODU2 frames from each client GFP/ODU2 mapper; and
- mapping the serialized ODU2 frames into OTU3 frames.

17. The system of claim 16, wherein the interworking device further includes a phase locked loop ("PLL"), and wherein the serialized ODU2 frames are mapped into OTU3 frames by an ODTU23 mapper, the interworking device further:
- transforming the second clock signal to a third clock signal wherein the third clock signal is phase and frequency locked to the second clock signal; and
- supplying the third clock signal to clock the ODTU23 mapper.

18. A method for distributing timing between at least two different communication networks, the method comprising:
- recovering a first reference timing signal from data received from a first communication network;
- transforming the first reference timing signal to a second reference timing signal, the second reference timing signal being phase and frequency locked to the first reference timing signal;
- supplying the second reference timing signal to clock a second communication network;
- recovering a third reference timing signal from data received from the second communication network;
- transforming the third reference timing signal to a fourth reference timing signal, the fourth reference timing signal being phase and frequency locked to the third reference timing signal; and
- supplying the fourth reference timing signal to clock the first communication network, wherein the first, second, third, and fourth reference timing signals are based on a fifth reference timing signal from a switch coupled to a hybrid synchronous equipment timing source.

* * * * *